2 Sheets—Sheet 1.

G. ELLENBERGER.

Process and Apparatus for Mashing.

No. 8,050. Reissued Jan. 22, 1878.

*Witnesses:*
Chas. Raettig.
E. Volkmann

*Inventor:*
Gustav Ellenberger
per Ernst Bilhuber
Attorney.

G. ELLENBERGER.

Process and Apparatus for Mashing.

No. 8,050. Reissued Jan. 22, 1878.

Witnesses:
Cha. Roettig
E. Volkmann

Inventor:
Gustav F. Ellenberger
per Ernst Bilhuber
Attorney.

UNITED STATES PATENT OFFICE.

GUSTAV ELLENBERGER, OF DARMSTADT, GERMANY.

IMPROVEMENT IN PROCESSES AND APPARATUS FOR MASHING.

Specification forming part of Letters Patent No. 169,156, dated October 26, 1875; Reissue No. 8,050, dated January 22, 1878; application filed December 31, 1877.

*To all whom it may concern:*

Be it known that I, GUSTAV ELLENBERGER, of Darmstadt, Germany, formerly of Bidenkopf, have invented certain new and useful improvements in process and apparatus for reducing and mashing amylaceous or saccharine vegetable substances, such as corn, grain, potatoes, &c, of which the following is a specification:

This invention relates to the process of steaming under pressure and before reduction, to the addition in the grinding and mixing apparatus of malt or other substances, to the grinding and mixing by a continuous circulation through the grinding device, and to the apparatus for steaming and mashing.

In carrying out my improved process, I use, by preference, the apparatus represented in the annexed drawings, in which similar letters of reference indicate like parts.

Figure 2:
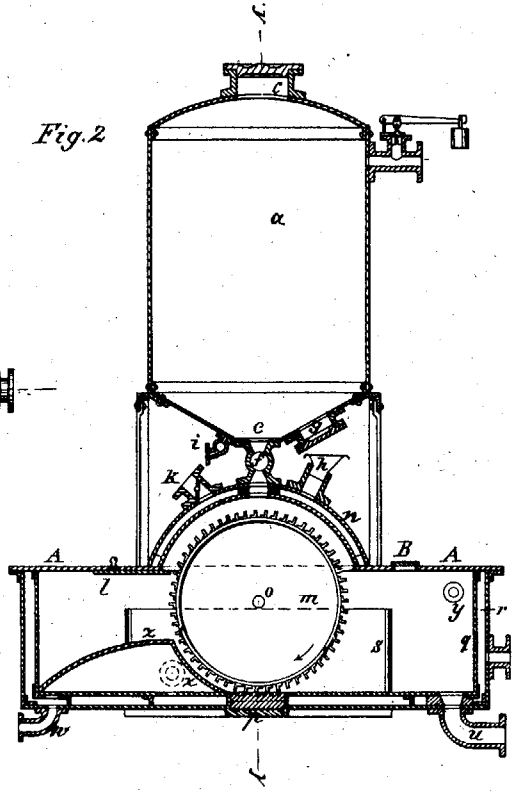
Figure 1:
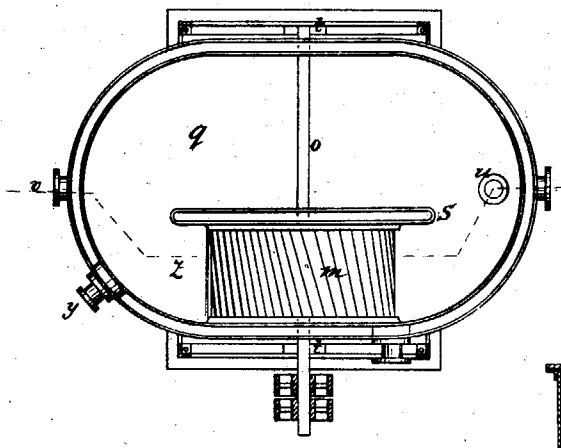
Figure 3:
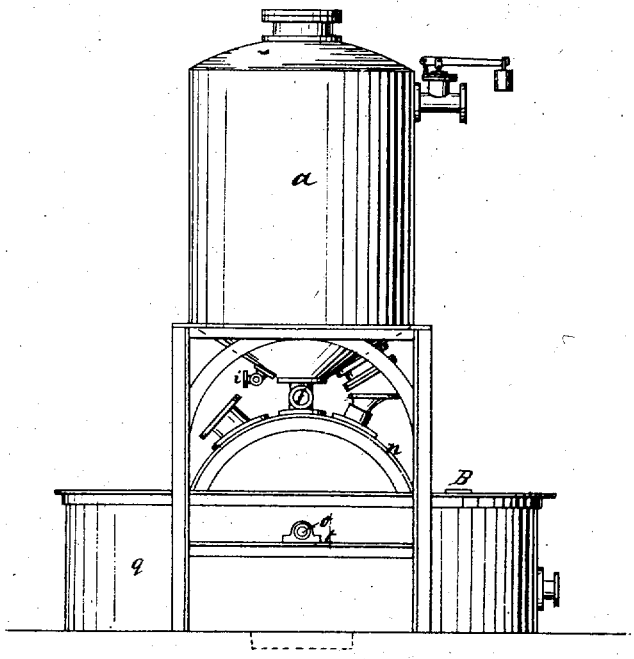
Figure 4:
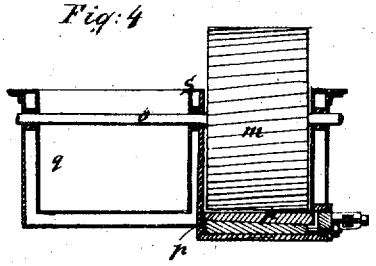

Figure 1 is a plan view of the mashing apparatus. Fig. 2 is a vertical longitudinal section of the steam-vat and mashing apparatus. Fig. 3 is an elevation of the apparatus. Fig. 4 is a section of Fig. 2, taken on the line *y y*.

*a* represents a steam-vat adapted to withstand a pressure of about seventy-five pounds to the square inch. It has a suitable opening, *c*, at the top for the introduction of the substances to be treated, which opening can be closed steam-tight. This vat is also provided with a pipe and valve for the admission of steam, with a safety-valve, a cock, *i*, for drawing off water of condensation, if required; also, a discharge-opening, *e*, at the bottom, regulated by a cock, *f*.

*q* is the mashing-vat or mixing-tub. It is oblong, with rounded ends, and may be constructed with double sides and bottom, for the admission of hot or cold water or steam.

*m* is the grinding or mash drum, attached to the shaft *o*, which is supported upon bearings *t t*. This drum is of cast-iron, and provided with knives or ribs on its periphery. Between these ribs and the bottom plate *p*, which is likewise provided with knives or ribs, the materials are ground.

The teeth or knives in the bed-plate *p* are, by preference, arranged diagonally to the teeth of the drum *m*. The plate *p* is made adjustable in a vertical direction; but the same effect is also produced by having the bed-plate fixed and the drum adjustable. Behind the drum *m* an inclined plate or sloping elevation, *z*, is arranged in the mash-tub, up one side of which the mash is forced by the rotation of the drum, and then falls down on the other side, thereby causing a rotation or continuous circulation of the mash round the mash-tub, and around the partition *s* in the central part of the tub, and back between the knives of the drum and of the bed-plate. The partition *s* may also have double walls, and be in communication with the double walls of the vat.

A A are lids or covers, made to fit tightly, removable at convenience. A covering, *n*, which may be hollow, is placed above the drum.

*l* is a slide-valve, regulating the flow of the mashing-liquor into the space above the drum, said flow arising from the centrifugal action of the same.

The operation when preparing materials for fermentation is as follows: The materials, before reduction, are charged into the steam-vat *a*. The charge-opening is then closed and steam admitted. When the materials have been sufficiently treated, the outlet *e* is opened, and, by means of the regulating-cock *f*, the charge is gradually lowered into the vessel below. The time required for steaming varies with the nature of the materials to be treated. During the steaming and preparation of the vegetable substances in the steam-vat, a regulated quantity of malt, together with water, is poured into the mashing-tub through the opening B of the cover. At the same time steam is admitted to the jacket and the drum is set in motion. Owing to the shape of the vat, and to the action of the drum between the central partition *s* and the wall of the vessel, this mixture of malt and water, rising gradually in temperature, is started upon a brisk circulation, repeatedly passing beneath the drum, and, being constantly subjected to the tearing and cutting action of the knives, is thoroughly reduced and intermixed, until it finally displays a milky color and consistency.

In order that the malt thus prepared may not be scalded by the admission of the hot products of the steam-vat, it is pumped into an elevated reservoir (not shown) through the pipe *u*. At this point—namely, when the contents of the steam-vat have been sufficiently penetrated and cooked by the steam—the outlet is opened. The prepared charge is lowered into the mashing-vat, and falls upon the drum, which revolves at the rate of two hundred revolutions per minute. When, by the addition of water, the contents have reached the consistency of a thin pulp, and have been cooled down to about 52° Reaumur, the previously-treated malt is admitted and the drum still kept in rapid motion.

After the addition of the sugar used in sweetening the mash, and when the whole has been thoroughly incorporated and fully intermixed, the covers are removed and the contents of the jacketed spaces drawn off. Cold water is now poured in through pipe *w*, the drum still in motion. The process of cooling, already induced by the cold surface of the vat, is accelerated by the air-currents caused by the rotation of the drum. The slide-valve *l* is now drawn back, thus admitting of a direct tangential discharge of a large quantity of the mash-liquor against the cold inner surface of the drum-cover *n*. When the mash has become thoroughly cool, yeast is added, the mass is once more intimately mixed, and is then ready for transfer to the fermenting-tub.

The advantages of my process and apparatus, as set forth in the foregoing description, are sufficiently obvious; but I may point out, in addition, a saving of time, economy in space, a great saving of materials, inasmuch as all are utilized and none wasted. The minute reduction brought about, united with the thorough and homogeneous mixing, alone makes it possible for all the starch particles to be sweetened and undergo a thorough separation.

What I claim as my invention is—

1. The process of producing a fine pulp from amylaceous or saccharine vegetable substances, as corn, grain, potatoes, &c., by steaming the materials under pressure before reduction, and then grinding the same, substantially as described.

2. In the art of reducing and mashing amylaceous or saccharine vegetable substances, and preparing the same for fermentation, the process herein described, which consists in first subjecting said substances to steam under pressure, afterward grinding the same while hot to a fine pulpy mass, and when said mass is partially cooled adding the requisite malt and sugar, which is followed by artificial cooling and the addition of yeast, substantially as described.

3. The process of grinding and mixing amylaceous or saccharine vegetable substances by a continuous circulation through the grinding device, substantially as described.

4. The combination of a closed steam-vat, for steaming under pressure, with a mashing-vessel, substantially as described.

5. A mashing apparatus consisting of a vat with a partition, *s*, in combination with a re-revolving drum, *m*, and plate *p*, substantially as described.

6. A mashing apparatus consisting of a vat with a partition, *s*, in combination with a revolving drum, *m*, plate *p*, and sloping elevation *z*, substantially as and for the purpose specified.

GUSTAV ELLENBERGER.

Witnesses:

ERNST BILHUBER,

E. VOLKMANN.